C. W. DEANE.
Tube-Expanders.

No. 139,374.  Patented May 27, 1873.

Witnesses,
Harry Smith
Thomas McIlvain

Collins W. Deane
by his Attys.
Howson and Son

UNITED STATES PATENT OFFICE.

COLLINS W. DEANE, OF PHILADELPHIA, PENNSYLVANIA.

IMPROVEMENT IN TUBE-EXPANDERS.

Specification forming part of Letters Patent No. 139,374, dated May 27, 1873; application filed March 11, 1873.

*To all whom it may concern:*

Figure 1:
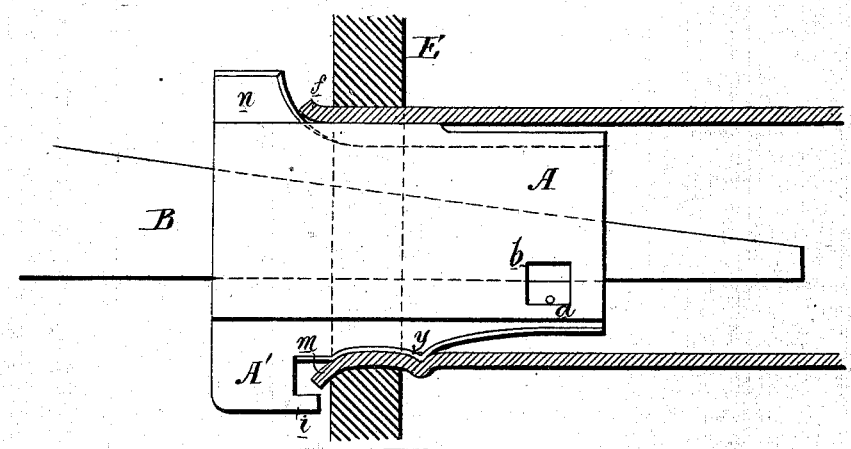
Figure 2:
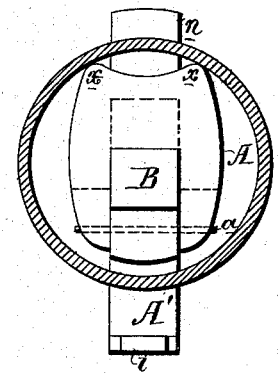
Figure 3:
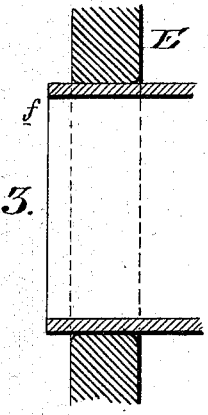
Figure 4:
Figure 5:
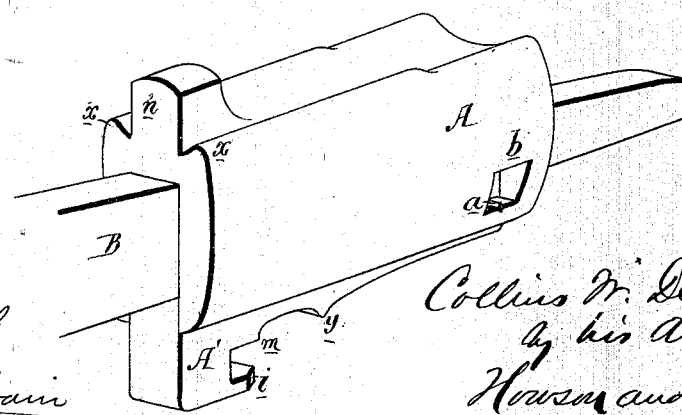

Be it known that I, COLLINS W. DEANE, of Philadelphia, Pennsylvania, have invented a Swaging-Tool for Boiler-Tubes, of which the following is a specification:

The object of my invention is to secure tubes to the tube-sheets of boilers, &c., with rapidity and precision, and without injury to the tubes; and this object I accomplish by means of a tool consisting of a swage in two parts, A and A', and a wedge, B, shown in the side view, Figure 1, of the accompanying drawing, and in the transverse section, Fig. 2, and also in the perspective view, Fig. 5, the driving of the wedge reducing the tube from the condition shown in Fig. 3 to that shown in Fig. 4, by the simultaneous operations of stretching the tube tight against the opening in the tube-sheet E, forming an annular bead on the tube against the inside of the sheet, and flaring the outer end $f$ of the tube against the exterior of the sheet, as shown in Fig. 4. The portion A of the swage is slotted to receive the portion A' and intervening wedge B, pins $a$ on the portion A projecting through such openings $b$ in the part A', that the two parts, although connected together, can be moved independently of each other. On placing the swage inside the tube, as shown in Fig. 1, and striking the wedge with a suitable hammer, the effect will be the forcing apart of the two portions A and A', the distension of the tube against the edge of the opening in the tube-sheet E by the ribs $x\, x$ of the portion A of the swage (see Fig. 2), the internal indenting of the tube by the projections $y$ of the portion A', and the consequent formation of the rib $e$ against the inside of the tube-sheet E, while the projection $m$ serves to partly bend the outer end of the tube; at the same time the blow on the wedge tends to force the portion A of the swage inward, while the portion A' remains stationary, with its lip $i$ in contact with the front of the tube-sheet, and as the portion A is thus driven inward the curved edge of its projection $n$ bends the end of the tube, as shown in Fig. 1. After the first blow a slight tap with the hammer against the side of the wedge will release the same and permit the instrument to be turned preparatory to the striking of another blow, and this alternate turning of the tool and striking of the wedge is continued until the tube is reduced to the condition shown in Fig. 4, and effectually secured to the tube-plate. Precisely the same results will take place when a brass ferrule intervenes between the exterior of the tube and the opening in the tube-sheet.

As the rib $e$ is being formed by the action of the projection $y$ the tube will be drawn inward to a limited extent, so as to afford a supply of metal demanded by the distension of the tube. This prevents the tearing of the metal, which might occur by distension if no yielding of the tube was permitted.

As the portion A' of the swage does not change its longitudinal position during the driving of the wedge, there must be a direct distension of the tube without that abrasion which in other tools has a tearing effect on the metal.

The curved projection $n$ for bending the end of the tube acts in unison with the ribs $x$; the slight internal indentation of the tube by the ribs leaves the metal between the said indentations free to be easily bent without injury.

A modification of the tool may be employed with advantage in tightening the tubes of old boilers, the portion A' in this modification being without the projection $y$.

I claim as my invention—

1. A two-part tube-swage, on one portion of which ribs $x\, x$ are combined with a curved projection, $n$, as and for the purpose herein set forth.

2. The within-described tool consisting of the portion A of the swage with its ribs $x\, x$, the portion A' with its projections $m$ and $y$, and the wedge B, all combined for joint action, as and for the purpose herein set forth.

In testimony whereof I have signed my name to this specification in the presence of two subscribing witnesses.

COLLINS W. DEANE.

Witnesses:
 WM. A. STEEL,
 HUBERT HOWSON.